(12) United States Patent
Nellen

(10) Patent No.: US 9,845,002 B2
(45) Date of Patent: Dec. 19, 2017

(54) OPEN ROOF CONSTRUCTION FOR A VEHICLE

(71) Applicant: Inalfa Roof Systems Group B.V., Oostrum (NL)

(72) Inventor: Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/233,587

(22) Filed: Aug. 10, 2016

(65) Prior Publication Data
US 2017/0043650 A1    Feb. 16, 2017

(30) Foreign Application Priority Data

Aug. 11, 2015    (EP) .................................... 15180623

(51) Int. Cl.
| | |
|---|---|
| *B60J 10/10* | (2006.01) |
| *B60J 10/82* | (2016.01) |
| *B60J 7/043* | (2006.01) |
| *B60J 7/047* | (2006.01) |

(52) U.S. Cl.
CPC .............. *B60J 10/82* (2016.02); *B60J 7/043* (2013.01); *B60J 7/047* (2013.01)

(58) Field of Classification Search
CPC ............. B60J 10/82; B60J 7/047; B60J 7/043
USPC .......................... 296/216.02–216.05, 220.01, 296/216.07–216.09
See application file for complete search history.

(56) References Cited

U.S. PATENT DOCUMENTS

| | | | | |
|---|---|---|---|---|
| 7,850,230 B2* | 12/2010 | Faerber | .................. | B60J 7/0435 296/216.03 |
| 8,807,639 B2* | 8/2014 | Sawada | .................... | B60J 7/053 296/216.06 |
| 2013/0307296 A1 | 11/2013 | Sawada | | |

FOREIGN PATENT DOCUMENTS

| | | | |
|---|---|---|---|
| DE | 20319522 U1 | 5/2005 | |
| JP | 2012091575 A | 5/2012 | |

OTHER PUBLICATIONS

International Search Report and Written Opinion for European patent application No. 15180623, dated Mar. 3, 2016.

\* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having a roof opening in a fixed roof part, comprises a first panel and a second panel for at least closing first and second portions of the roof opening. The first panel is movably supported by an operating mechanism guided in a guide rail. A rear support member partly moves alongside the second panel when the first panel moves above the second panel. The seal of the second panel and/or of the fixed roof part being such that the rear support member is enabled to pass between the second panel and the fixed roof part. The seal for the second panel extends, in lateral sense, more inwardly than the seal of the first panel at the rear thereof when in the closed position, the rear support member passing between the seal on the holding member and the second panel.

12 Claims, 11 Drawing Sheets

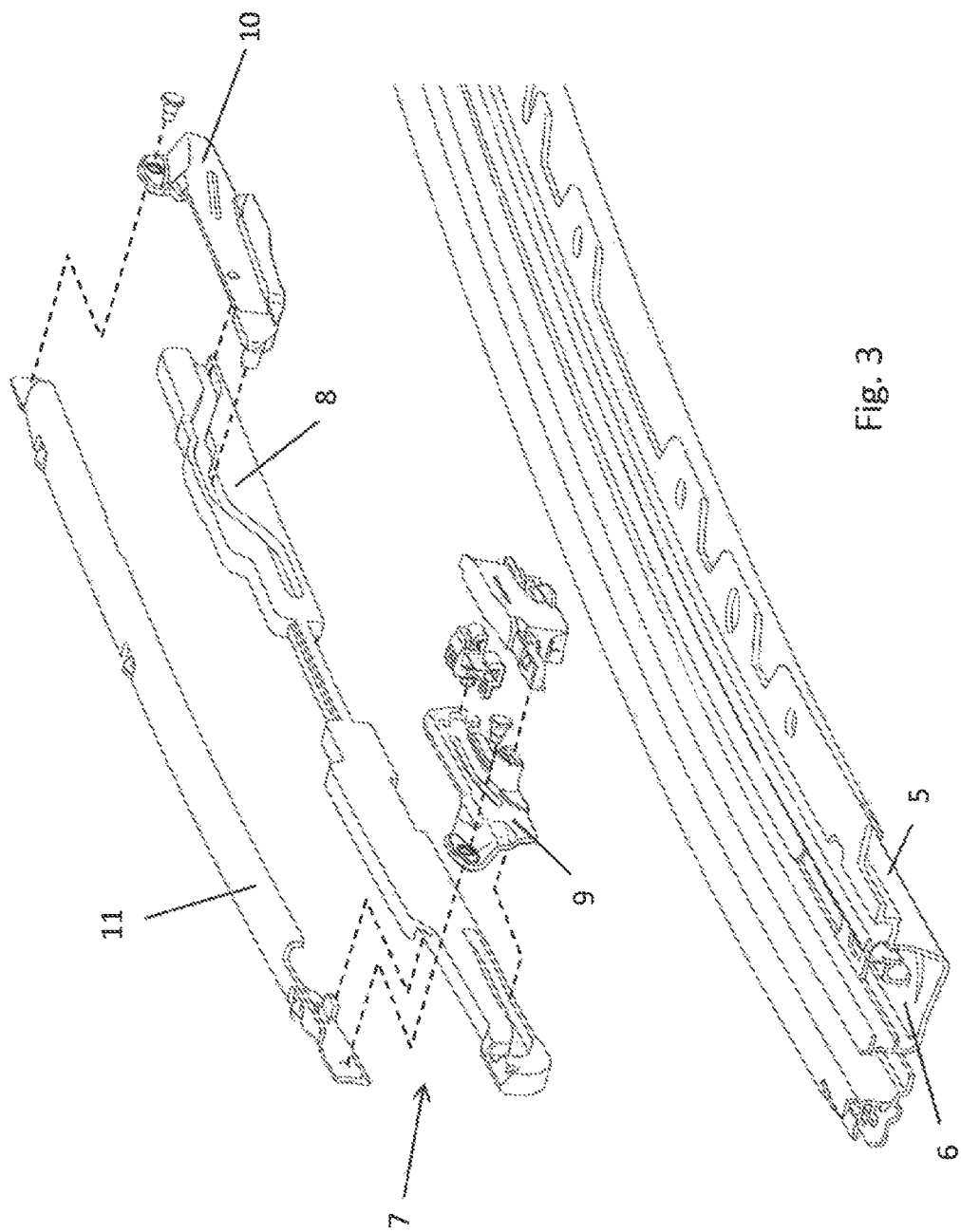

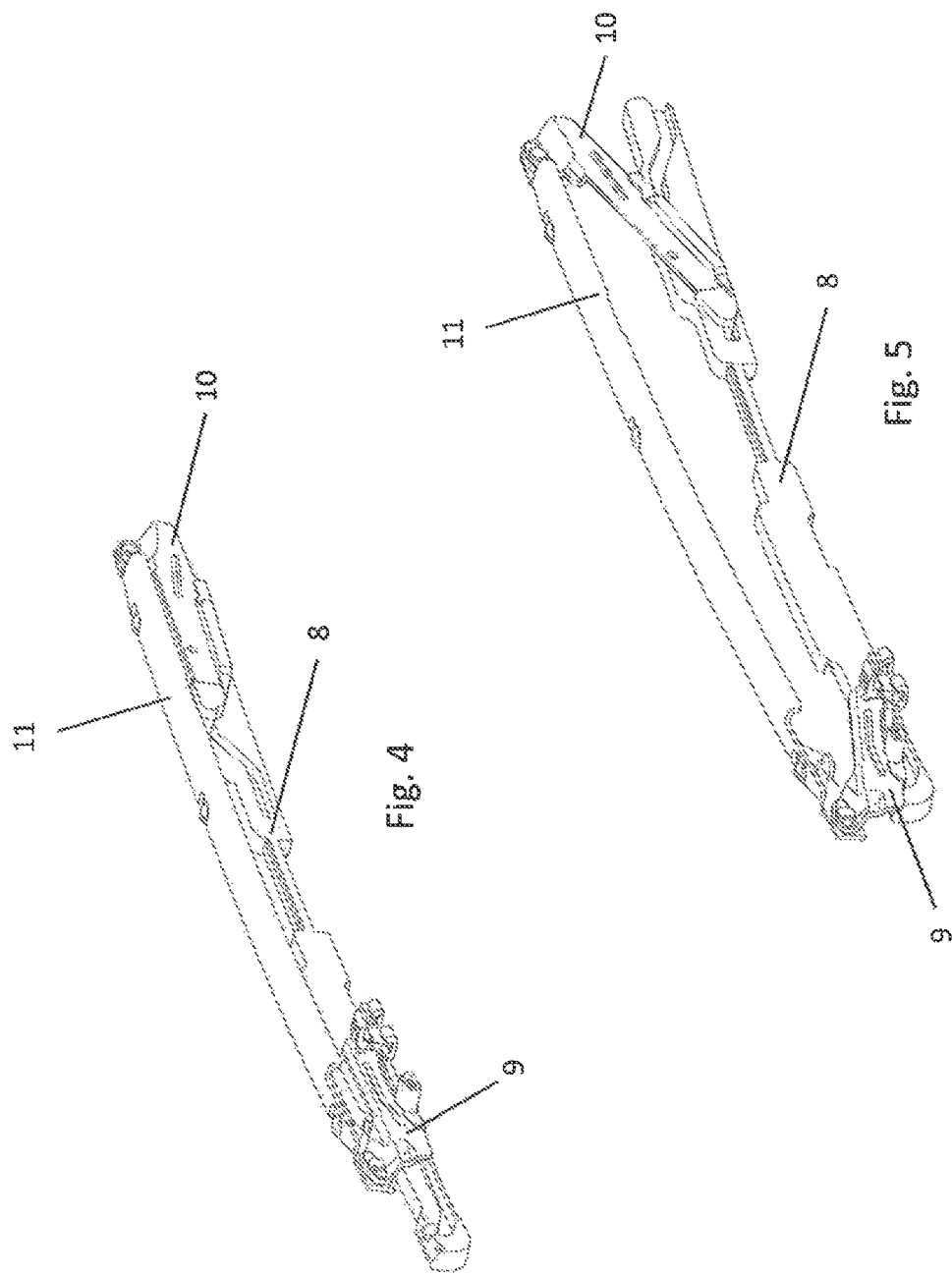

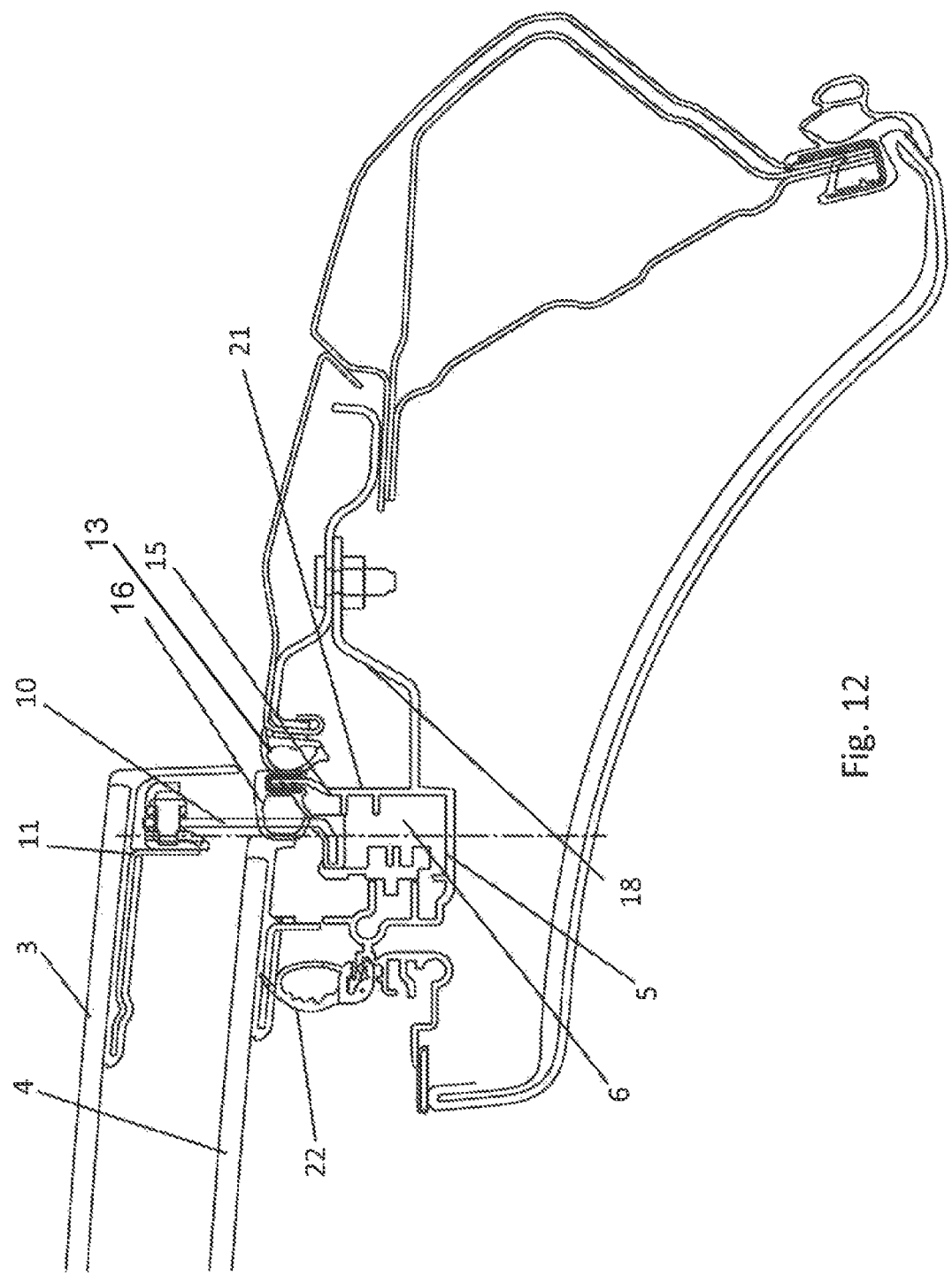

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle having a roof opening in a fixed roof part. The open roof construction includes a stationary part, a first panel for closing and at least partly opening a first portion of the roof opening and a second panel for at least closing a second portion of the roof opening. The first and second panel and/or the stationary part are provided with a seal to seal side edges of the first and second panels with respect to the fixed roof part. The first panel is movably supported by an operating mechanism guided in a guide rail of the stationary part extending along at least one longitudinal side of the roof opening. The operating mechanism includes a rear support member attached to the first panel and supporting the panel in its rear portion. The guide rail and operating mechanism is such that the rear support member is movable to an extent that it partly moves alongside the second panel when the first panel moves above the second panel. The rear support member is bent relatively far outwardly (creating a C-shaped rear support member) in order to pass between the seals of the rear panel and fixed roof. As the attachment of the rear support member to the panel cannot be positioned that far outwardly due to the use of a fixing screw, bending forces are introduced into the support jeopardizing stability thereof. Also the building height of the operating mechanism in the closed position of the front panel can increase due to such outward position of the rear support member.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

An open roof construction according to an aspect of the invention includes a seal for the second panel that is attached to a holding member such that at the front of the second panel it extends, in a lateral sense, more inwardly than a seal of the first panel at the rear thereof when in the closed position, which enables the rear support member to pass between the seal on the holding member and the second panel.

Due to the placement of the seal for the second panel on the holding member, it is not necessary to have a seal on the panel itself, so the support member may be positioned more inwardly, leading to a more straight and less bulky design of the support member, and in some occasions also to more favorable use of space and therefore less building height.

In one embodiment, the operating mechanism of the first panel includes a front support member, at least a central portion of the front and rear support member being longitudinally aligned.

In such an operating mechanism it is favorable if the rear support member is positioned more inwardly, because in that case the front support member is also positioned more inwardly. This makes it possible for a wind deflector to extend to a position outside the front support member which is favorable from an aerodynamic point of view. Especially wind noise can be reduced if the wind deflector extends up to the sides of the roof opening.

"Inwardly" in this disclosure means in a lateral sense, i.e. more to a central longitudinal axis of the roof and vehicle. "Outwardly" is thus more away from the central longitudinal axis.

Furthermore, the arrangement of the support members in longitudinal alignment enables the operating mechanism of the first panel to be such that the panel is configured to move rearwardly to such an extent that the front guide member passes between the seal on the holding member and the second panel.

This leads to a very large roof opening in the open position of the front panel.

The open roof construction herein described may be configured for a vehicle having a roof seal attached to a circumferential edge of the roof opening, and in that case the holding member may be positioned inwardly of the roof seal such that the seal for the second panel mates with the roof seal on the outer side and with the second panel on the inner side.

Thus, this roof seal can be used to cooperate with (the seal of) the front panel and with the seal of the holding member. As a result, it is not necessary to adapt the roof seal. The holding member with the seal is used for the adaptation.

It is favorable if the holding member extends below the edge of the roof opening and forms a water drain.

Thus, any water leaking between the roof edge and the holding member can be caught and drained.

The holding member is formed on the stationary part or is attached to at least one of the stationary part and vehicle roof.

The first and second panels are provided with an encapsulation around their circumference, configured to cooperate with the sealing means at least in a substantially horizontal direction.

BRIEF DESCRIPTION OF THE DRAWINGS

Aspects of the invention will further be explained with reference to the drawing showing an embodiment of the open roof construction by way of example.

FIG. 3 is an exploded view of an operating mechanism and supporting guide rail on one side of the first panel of the open roof construction.

FIGS. 4 and 5 are perspective views of the operating mechanism of FIG. 3 without guide rail and in two different positions.

FIGS. 10, 11 and 12 are cross sectional views according to the lines X-X, XI-XI and XII-XII in FIG. 2, showing three embodiments of the open roof construction the front panel in an open position.

DETAILED DESCRIPTION OF THE ILLUSTRATIVE EMBODIMENTS

Figure 1:
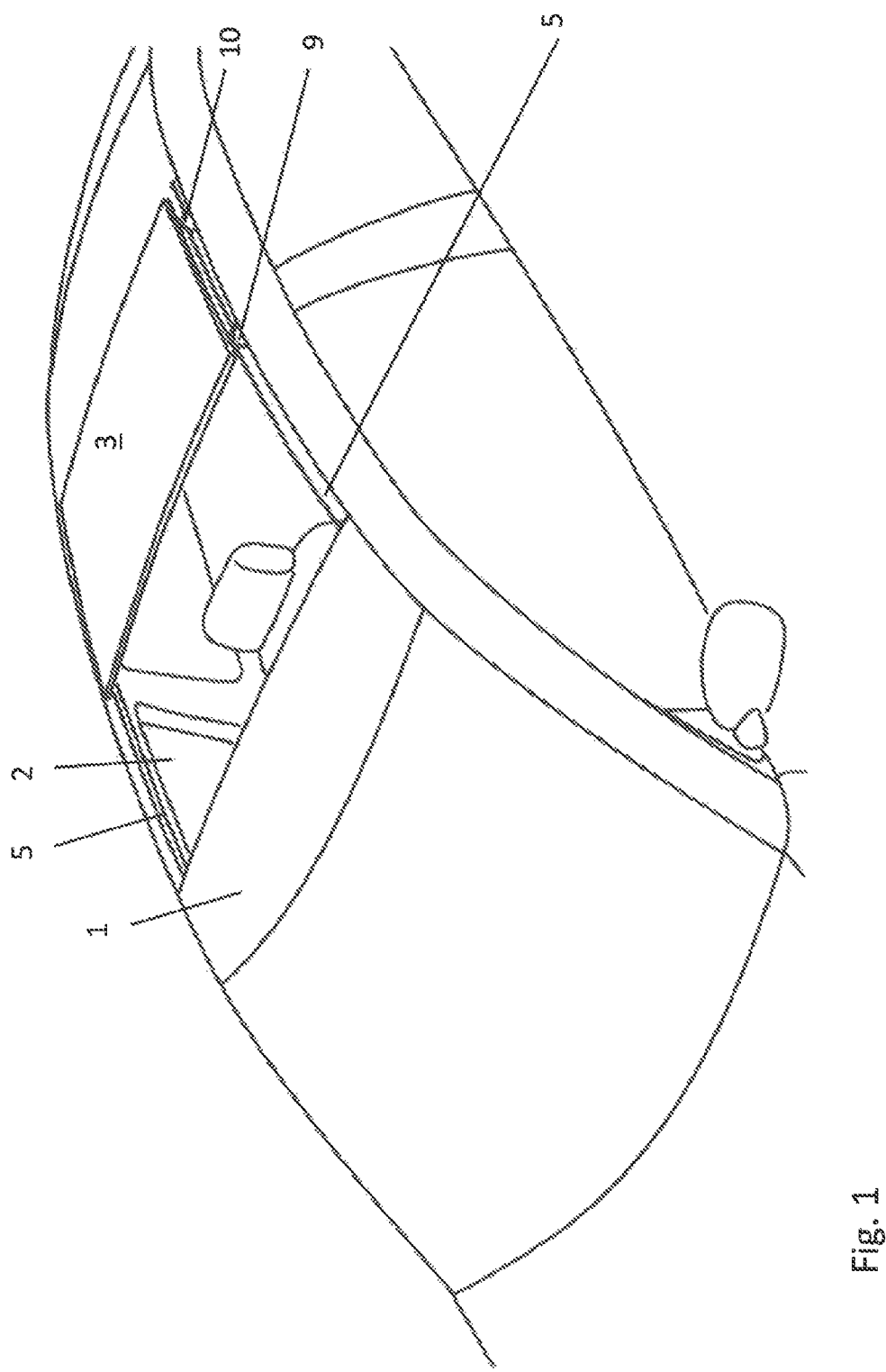
FIG. 1 is a schematic perspective view of the upper part of a passenger car of which the roof is provided with the open roof construction.

The drawing, and in first instance FIG. 1, shows a vehicle, such as a passenger car or utility vehicle, comprising a fixed roof portion 1, in which a roof opening 2 has been formed for the purpose of accommodating an open roof construction. The fixed roof portion 1 may be part of the vehicle or part of the open roof construction and replacing the normal roof of the vehicle. In this embodiment the roof assembly comprises a first or front closure element 3 and a second or rear closure element 4 which are both in the form of a rigid panel, which may or may not be transparent, and which together close the roof opening 2 in their closed position and of which at least the front panel 3 can be opened from said closed position. The front panel 3 can in any case be opened by moving the rear side of the panel 3 upwardly and sliding the panel 3 rearwardly over the second panel 4. The second closure element 4 is in this case a fixed panel.

Figure 2:
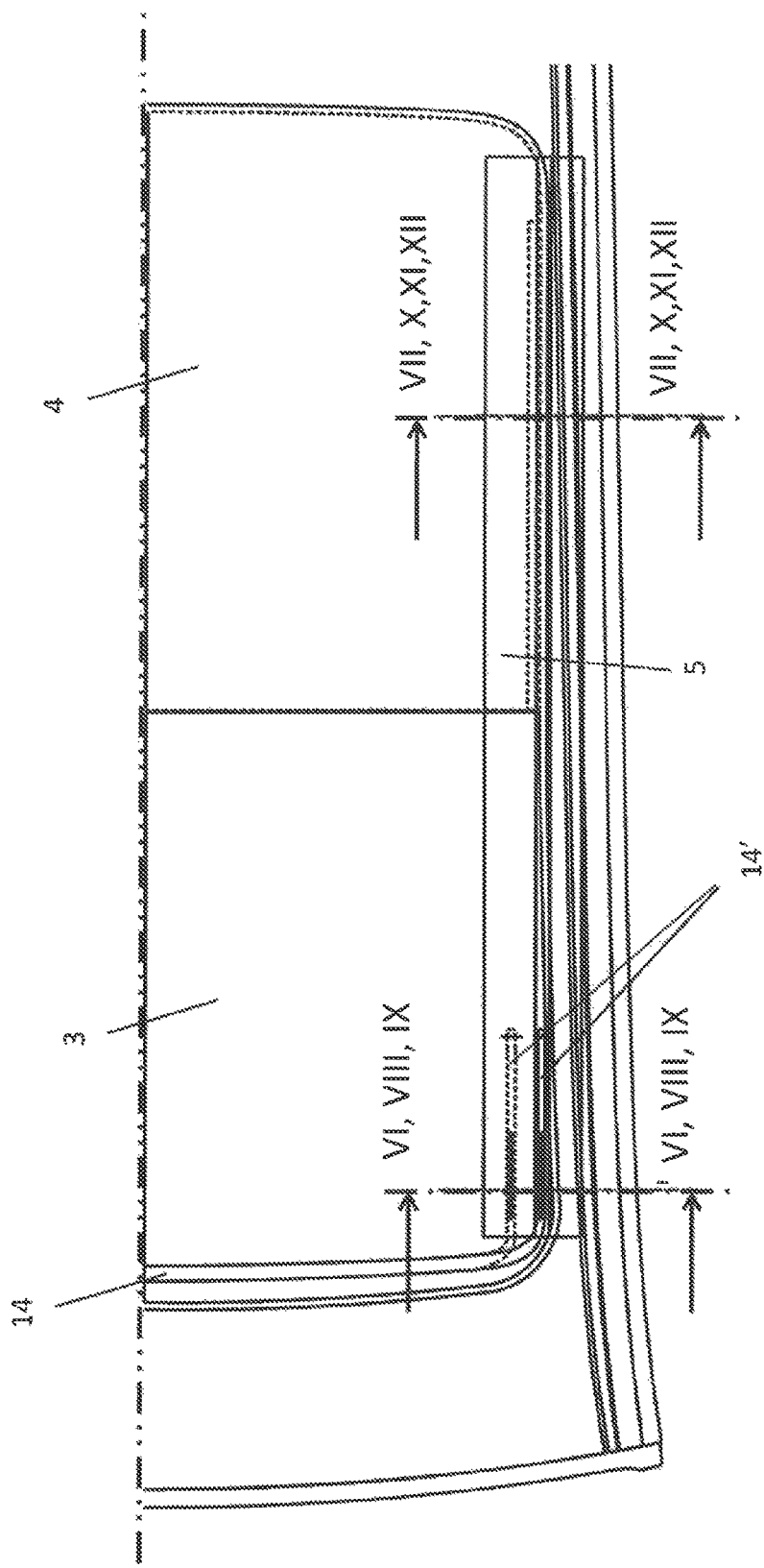
FIG. 2 is a schematic plan view of one half of the open roof construction of FIG. 1.

FIGS. 1 and 2 show that to guide the front panel 3 there are provided guide rails 5 which form the stationary part of the open roof construction or are attached thereto, in which case the stationary part may be a frame. The guide rails 5 each extend along the corresponding roof opening, in this case not only at the position of front panel 3, but also at the position of rear panel 4. These guide rails 5 are continuous.

FIG. 3 shows such guide rail 5, which includes several guide grooves. A guide groove 6 is used to guide an operating mechanism 7 for front panel 3. This operating mechanism 7 includes a main slide 8, a front support member 9 and a rear support member 10, here in the form of levers which control the height of the front and rear side of panel 3 by means of slide 8 and guide rail 5. The levers 9, 10 are aligned with each other in longitudinal direction of the roof. Levers 9 and 10 connect on their upper end to a panel bracket 11 attached to the lower side of panel 3, for example by encapsulation of plastic material or by gluing. The operating mechanism 7 will not be elucidated in further detail. It is described and shown in DE 202014103089 and a similar mechanism in U.S. Pat. No. 8,857,903, the complete contents of which documents are incorporated herein by reference thereto.

FIGS. 4 and 5 show operating mechanism 7 in two positions: the closed position in FIG. 4 and the fully raised position in FIG. 5. Panel 3 can be moved rearwardly when operating mechanism 7 is in this fully raised position. Both the front and rear side of panel 3 have been raised then. The operating mechanism 7 is such that slide 8 and connected levers 9 and 10 can be moved rearwardly to such an extent that front lever 9 passes beyond the front side of rear panel 4, so that in the rearmost position of front panel 3 both levers 9 and 10 are positioned besides rear panel 4.

Figure 6:
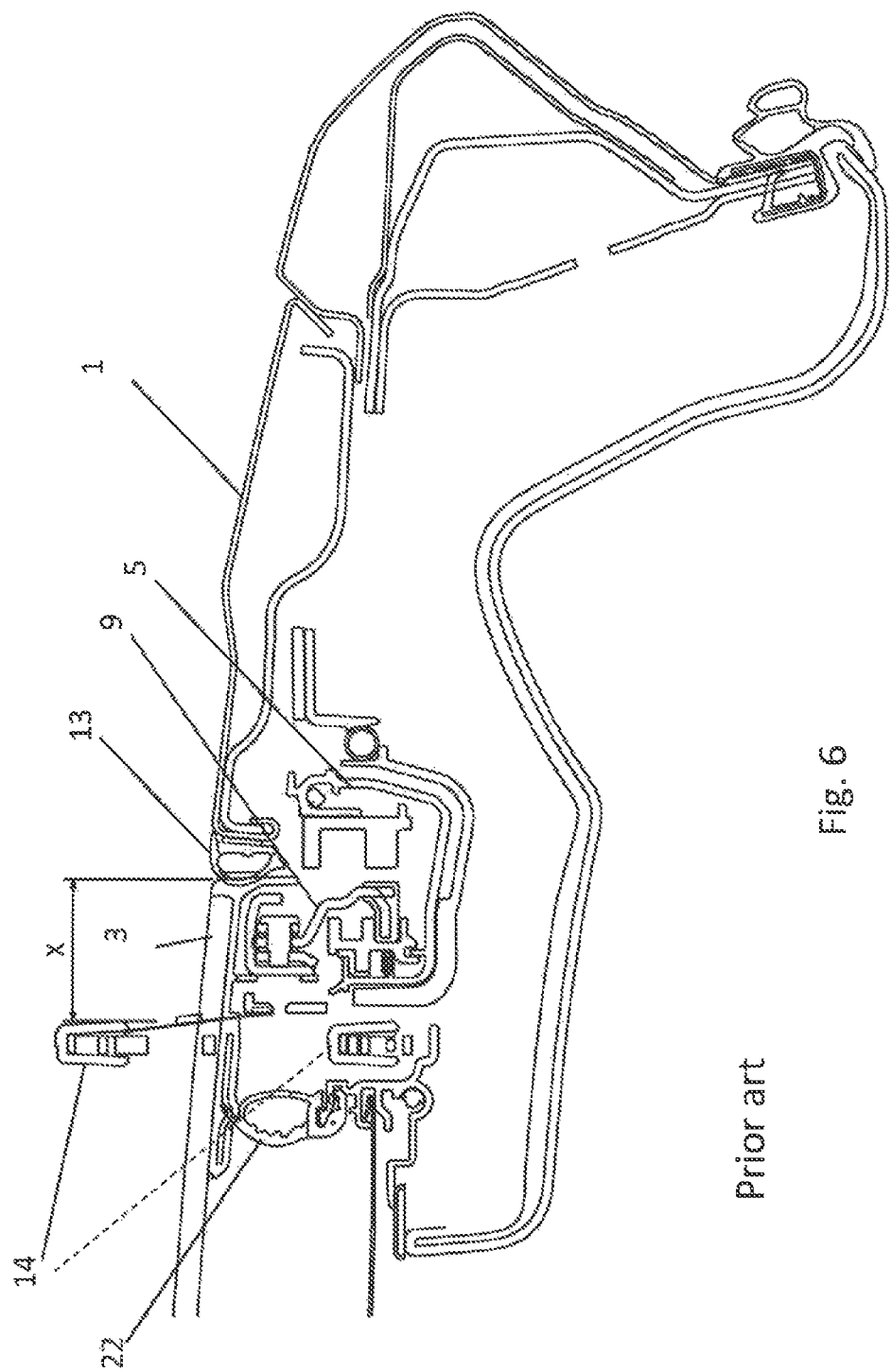
FIGS. 6 and 7 are cross sectional views at the position of line VI-VI and VII-VII in FIG. 2, but showing a prior art open roof construction.
Figure 7:
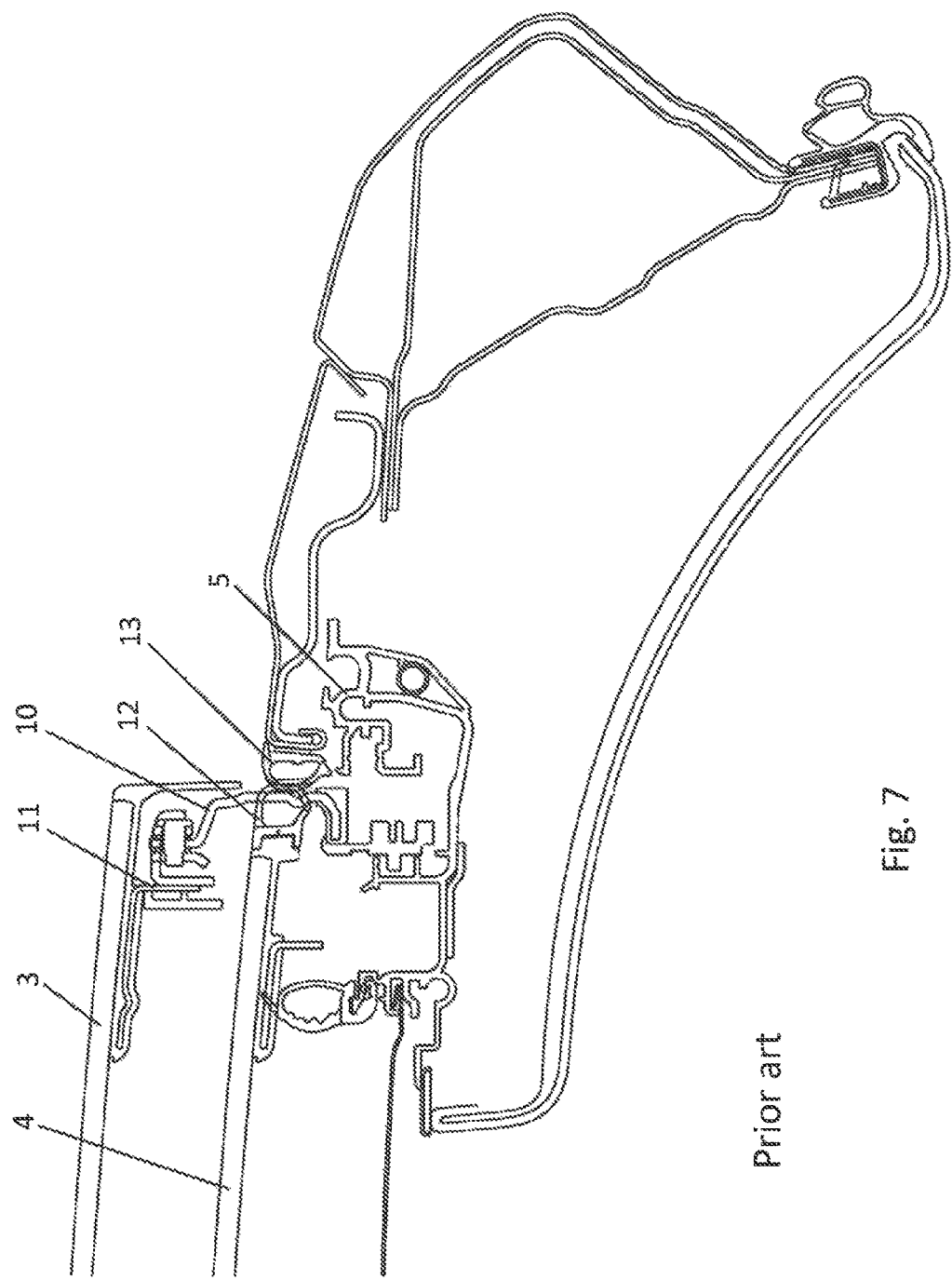

FIGS. 6 and 7 show a prior art embodiment of the open roof construction. FIG. 6 shows the operating mechanism at the front of front panel 3 while it is closed, and FIG. 7 shows it at the position of rear panel 4 while front panel 3 is moved rearwards. The seal structure of rear panel 4 is such that front and rear levers 9, 10 can pass between a seal 12 around rear panel 4 and a roof seal 13 at the edge of roof opening 2. The main portion of rear lever 10 where it passes seal 12 is relatively far outwardly relative to the panel bracket 11 to which it is connected. Due to this outward placement of the rear lever 10 (FIG. 6) and consequently also of the front lever 9 (FIG. 7), end parts 14' of a wind deflector 14 (and the corresponding support members) cannot be positioned outwardly thereof and must thus be placed inwardly thereof, which is unfavorable for the wind noise production due to the large distance X between the side of the roof opening 2 and the wind deflector end part 14'. FIG. 2 shows the end parts 14' of prior art wind deflector 14 in dashed lines.

Figure 8:
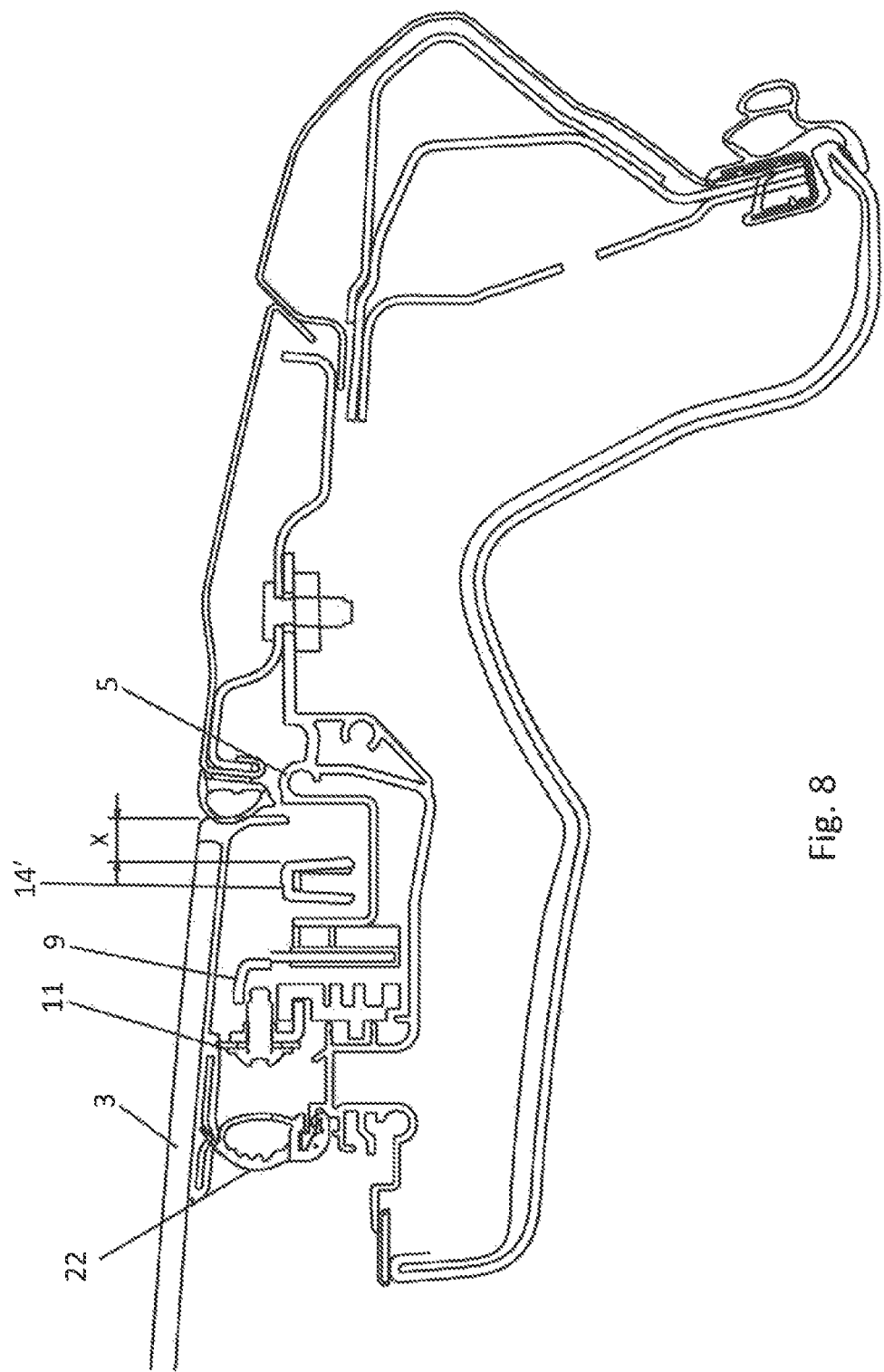
FIGS. 8 and 9 are cross sectional views according to the lines VIII-VIII and IX-IX in FIG. 2, showing two different embodiments of the open roof construction with the front panel closed.
Figure 10:
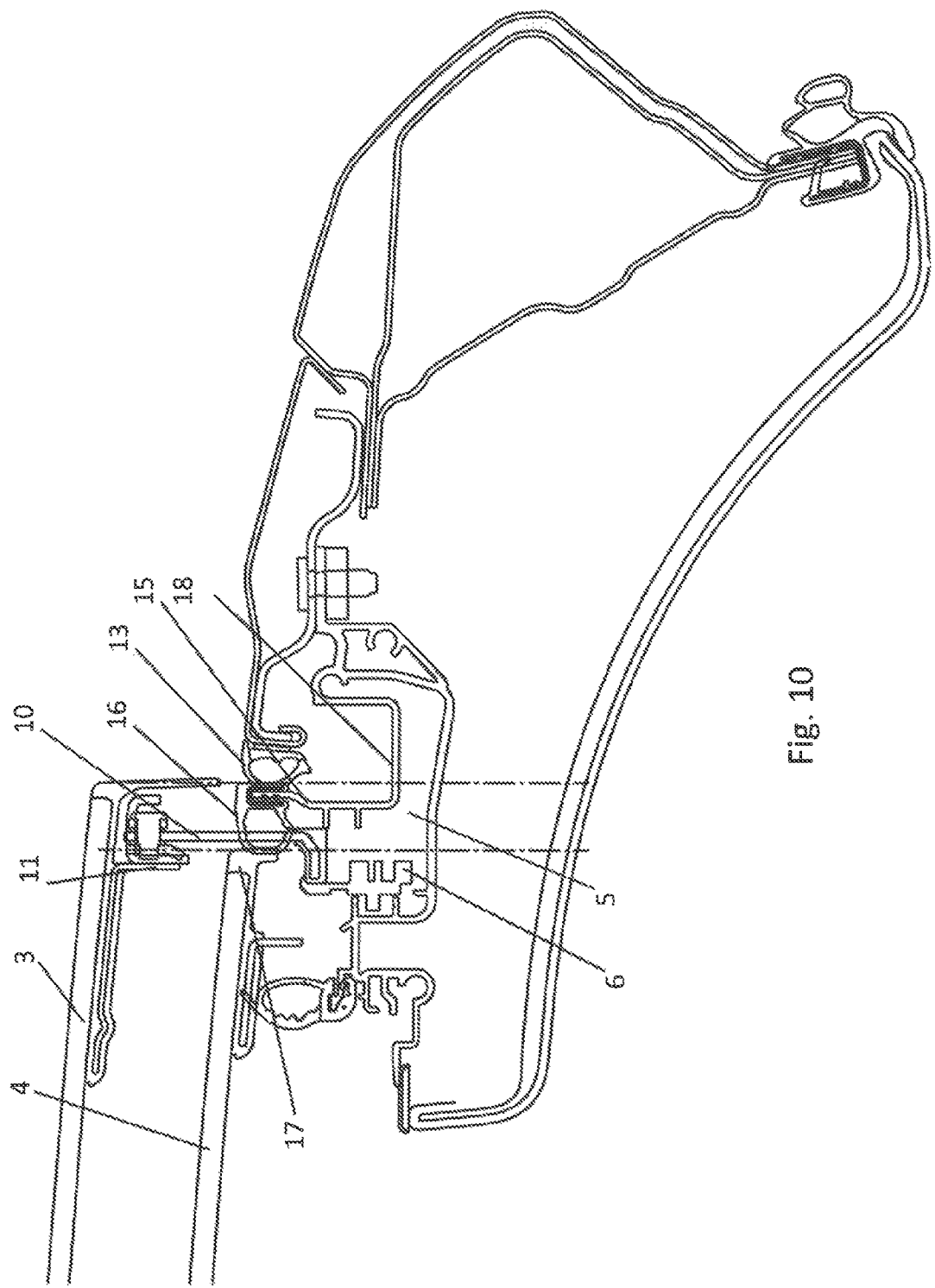

FIGS. 8 and 10 show an embodiment of the open roof construction according to aspects of the invention. From these drawings it becomes clear that the sealing arrangement for the rear panel 4 is different, such that the rear and front levers 9, 10 can be placed more inwardly, as a result of which the end parts 14' of wind deflector 14 can be positioned outwardly thereof, thereby making distance X (FIG. 8) smaller which makes it possible to reduce wind noise.

FIG. 10 shows that a holding member 15 is provided to hold a seal 16 alongside the rear panel 4. This seal 16 seals to an encapsulation 17 of rear panel 4 on the inner side and to roof seal 13 on the outer side. The rear and front levers 9, 10 pass between the encapsulation 17 of rear panel 4 and the inner side of seal 16. The two dashed lines in FIG. 10 show the distance through which the seal 16 of rear panel 4 has been moved inwardly with respect to the embodiment of FIG. 7. The seals 16 for rear panel 4 at the front thereof is now positioned inwardly of seal 13 which cooperates with the side edge of front panel 3 at the rear side thereof (in closed position), which is also the distance between the two dashed lines. The rear lever 10 (and front lever 9) extends substantially straight downwardly from the point of attachment to panel bracket 11 so that the levers occupy less space in lateral direction when they are in their downwardly tilted position, and offer better transmission of forces between the panel 3 and the operating mechanisms in their upwardly tilted positions. Thus, the design of the levers 9 and 10 is different from the ones shown in FIGS. 3-7.

Holding member 15 in this case is a substantially vertical flange which is part of the guide rail, which in this case is an extruded (aluminum) profile. The holding member 15 is formed at the inner upper end of an additional drain gutter 18 extending below the roof seal 13 to catch any water seeping through between roof seal 13 and sealing means 16 of holding member 15, and communicates with one or more drain pipes/hoses (not shown) guiding any water away to a position outside the car body.

FIG. 8 shows that, in the closed position of panel 3, wind deflector end part 14 is lowered into drain gutter 18, i.e. the wet part of the roof.

Figure 9:
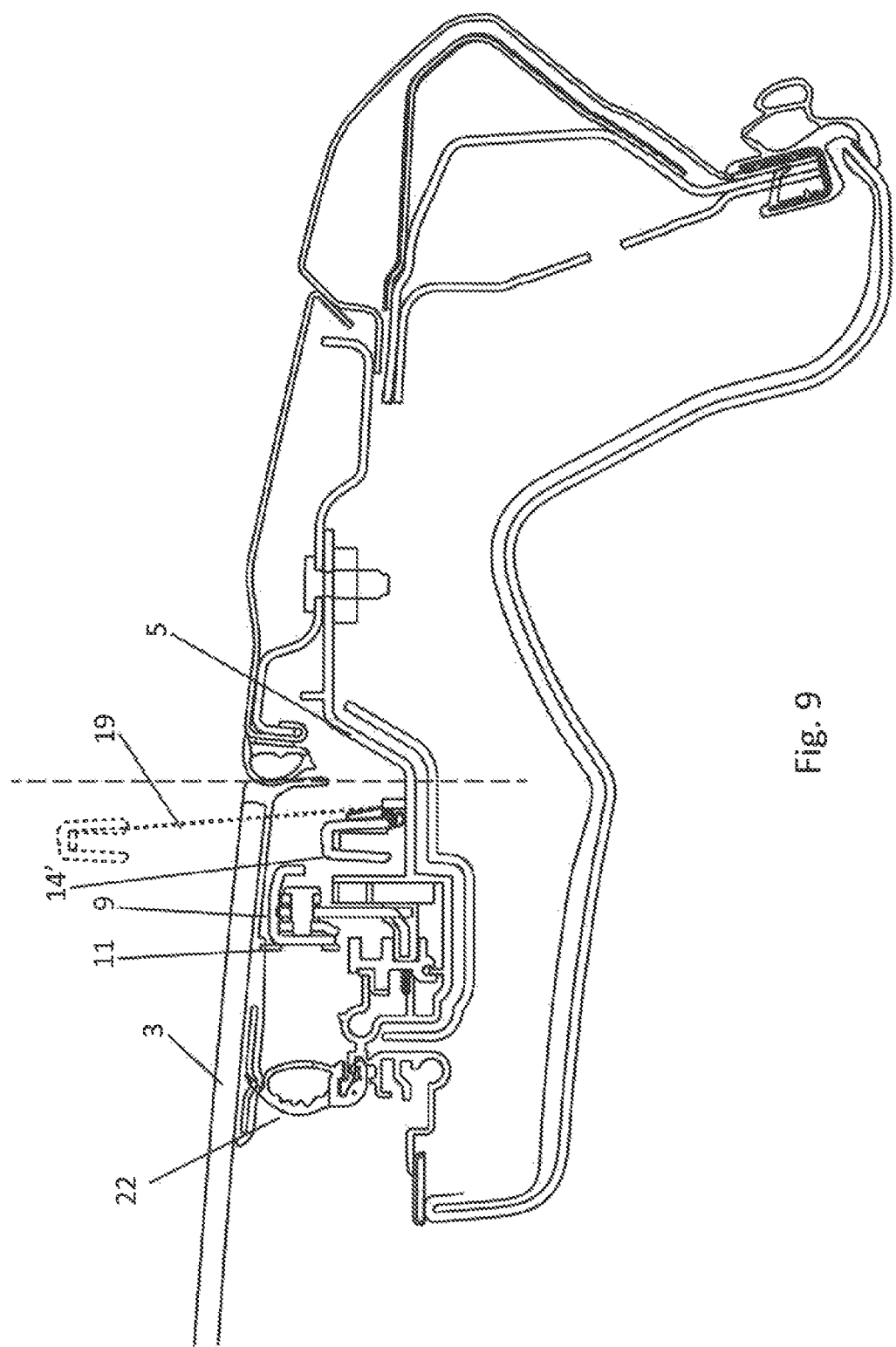

FIG. 9 is a section at the front side of panel 3 showing a variation of the open roof construction. The wind deflector is of the type comprising a flexible netting 19 which is stretched when the wind deflector is moved from the downward ineffective position to the upward effective position.

Figure 11:
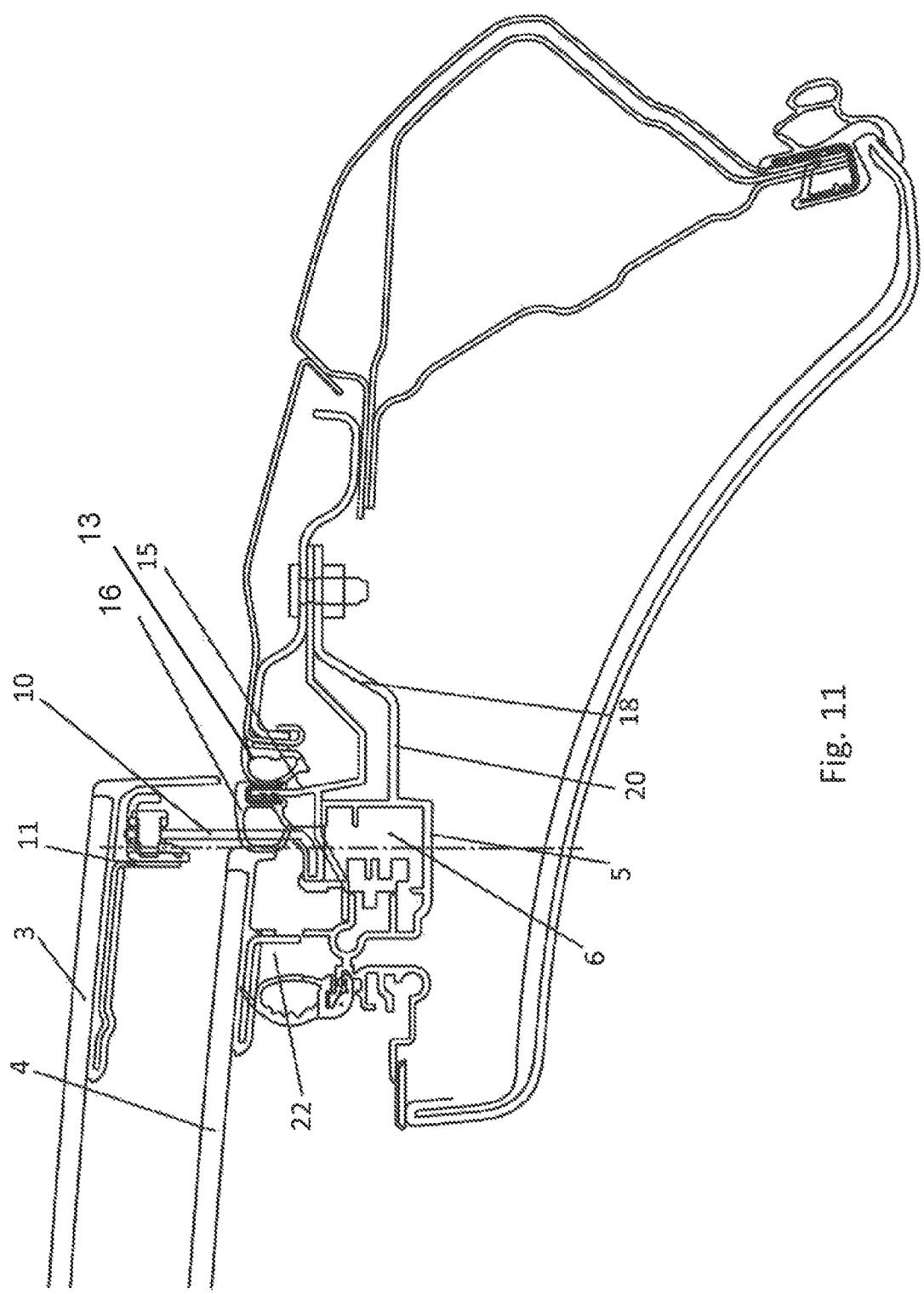

In the further embodiment of FIG. 11, the holding member 15 is formed on a separate profile 20 attached to the guide rail 5 at the position where it is attached to the roof 1. This separate profile 20 is supported at its inner side on another portion of guide rail 5 and also forms the drain gutter 18.

In the embodiment of FIG. 12, the holding member 15 is a flange forming the upper end of an already existing rib 21 bordering guide groove 6 of guide rail 5. The space outside rib 21 is formed as the drain gutter 18.

The holding member 15 and seal 16 may extend from front to rear side of rear panel 4, but it is also possible to extend it only up to the position corresponding to the rear position of rear lever 10. Behind this point, rear panel 4 may comprise the same seal arrangement as in FIG. 7.

The seals 12, 13 and 16 described above are (bulb) seals that are attached to or cooperate with the side edge of panels 3 and 4, so that they seal in a horizontal direction. However, it is possible to arrange additional seals cooperating with the lower side of the panel or panels, thus forming a vertical seal. For example in FIGS. 6-12 it is shown that additional seals 22 are arranged at the inner side of guide rail 5 to seal against the lower side of panels 3 and 4.

From the forgoing it will be clear that the invention provides a rearrangement of the seals for the rear panel to obtain a more favorable positioning of the support members for the panel resulting in several advantages such as a more stable support of the panel, a less bulky design of the support members and an improved design of the wind deflector.

The invention is not limited to the embodiments shown in the drawings and described above, which can be varied in different manners within the scope of the appended claims. Aspects of the various embodiments can be used in other combinations. The invention is for example also useful in roofs in which the roof opening in the fixed roof is not provided with a bulb seal, but only with a surface with which a seal can mate. In that case, the sealing means of the holding member can be provided with a (bulb) seal on both sides. The invention is suited for all kinds of operating mechanisms as long as it has at least one, and preferably two aligned, support members for the front panel operated to move the front panel to positions above a rear panel.

What is claimed is:

1. An open roof construction for a vehicle having a roof opening in a fixed roof part, comprising:
    a guide rail extending along at least one longitudinal side of the roof opening;
    a first panel for closing and at least partly opening a first portion of the roof opening and a second panel for at least closing a second portion of the roof opening;
    a first seal to seal at least side edges of the first panel with respect to the fixed roof part;
    an operating mechanism guided in the guide rail and configured to movably support the first panel, the operating mechanism including a rear support member attached to the first panel and supporting a rear portion of the first panel, the guide rail and operating mechanism being such that the rear support member is movable to an extent that the rear support member partly moves alongside the second panel when the first panel moves above the second panel; and
    a second seal for the second panel, wherein the second seal for the second panel is attached to a holding member such that at a front of the second panel it extends, in lateral sense, more inwardly than the first seal of the first panel, the rear support member passing between the second seal on the holding member and the second panel when the first panel moves above the second panel.

2. The open roof construction according to claim 1, wherein the operating mechanism of the first panel includes a front support member, at least a central portion of the front support member and of the rear support member being longitudinally aligned.

3. The open roof construction according to claim 1, wherein the first seal comprises a roof seal attached to a circumferential edge of the roof opening.

4. The open roof construction according to claim 3, wherein the holding member is positioned such that the second seal for the second panel mates with the roof seal on its outer side and with the second panel on its inner side.

5. The open roof construction according to claim 1, wherein the holding member extends below an edge of the roof opening and forms a water drain.

6. The open roof construction according to claim 1, wherein the holding member is formed as part of the guide rail.

7. The open roof construction according to claim 1, wherein the holding member is attached to the fixed roof part.

8. The open roof construction according to claim 1, wherein the first and second seals are formed by bulb seals.

9. The open roof construction according to claim 1, wherein the first and second panels are provided with an encapsulation around their circumference, configured to cooperate with the second seal at least in a substantially horizontal direction.

10. The open roof construction according to claim 1, wherein the rear support member extends substantially vertically downwardly from its point of attachment to the first panel.

11. The open roof construction according to claim 2, wherein the front support member and the rear support member are guided in a common guide groove of the guide rail.

12. The open roof construction according to claim 4, wherein the holding member is positioned inwardly of the roof seal.

* * * * *